United States Patent
Jayapalan et al.

(10) Patent No.: US 8,432,796 B2
(45) Date of Patent: Apr. 30, 2013

(54) METHOD, COMPUTER PROGRAM PRODUCT, AND APPARATUS FOR PROVIDING AUTOMATIC GAIN CONTROL VIA SIGNAL SAMPLING AND CATEGORIZATION

(75) Inventors: Vijay Jayapalan, Irving, TX (US); Mike Metaxas, Oakland Gardens, NY (US); Sundar Padmanabhan, Irving, TX (US); Manvinder Chopra, Carrollton, TX (US); Jim Bartlett, Santa Barbara, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1034 days.

(21) Appl. No.: 11/857,240

(22) Filed: Sep. 18, 2007

(65) Prior Publication Data

US 2009/0073961 A1    Mar. 19, 2009

(51) Int. Cl.
*G01R 31/08* (2006.01)
*G06F 11/00* (2006.01)

(52) U.S. Cl.
USPC .................................................. 370/230

(58) Field of Classification Search .................. 370/230, 370/352, 391
See application file for complete search history.

(56) References Cited

U.S. PATENT DOCUMENTS

| | | | |
|---|---|---|---|
| 6,453,022 B1 * | 9/2002 | Weinman, Jr. | 379/88.13 |
| 6,993,125 B2 * | 1/2006 | Michaelis | 379/391 |
| 7,006,616 B1 * | 2/2006 | Christofferson et al. | 379/202.01 |
| 2002/0173864 A1 * | 11/2002 | Smith | 700/94 |
| 2006/0023061 A1 * | 2/2006 | Vaszary et al. | 348/14.08 |
| 2006/0221942 A1 * | 10/2006 | Fruth et al. | 370/356 |
| 2008/0037749 A1 * | 2/2008 | Metzger et al. | 379/202.01 |

* cited by examiner

*Primary Examiner* — Mark Rinehart
*Assistant Examiner* — Maharishi Khirodhar

(57) ABSTRACT

An apparatus for detecting and adjusting volumes levels may include a processor capable of receiving data from a carrier (s). The processor is also capable of receiving trigger control signals from a trigger control and arranging the data into frames that are stored in a buffer. The processor is also capable of determining whether the trigger control signals include data indicating whether a determination regarding adjustment of a volume level of the data is required. The apparatus also includes a packet analyzer capable of calculating an average volume level associated with the frames when a determination reveals that adjustment of the volume level is required and is capable of generating categories, corresponding to intensity levels and categorizing the frames according to the intensity levels based on the average. The packet analyzer is also capable of determining whether to adjust the volume level based on a category assigned to the frames.

26 Claims, 4 Drawing Sheets

METHOD, COMPUTER PROGRAM PRODUCT, AND APPARATUS FOR PROVIDING AUTOMATIC GAIN CONTROL VIA SIGNAL SAMPLING AND CATEGORIZATION

BACKGROUND INFORMATION

Voice over Internet Protocol (VoIP) enables the conversion of analog audio signals, such as voice signals, into digital data that can be transmitted over a packet-switching network such as the Internet. Currently, VoIP communication systems are becoming more prevalent. Some of the advantages of utilizing a VoIP communication system over a traditional telephone system consist of the ability to manipulate voice data as well as the ease of accessibility to a VoIP network. For instance, a user of a VoIP telephone can receive incoming calls almost anywhere that the user can connect to the Internet. In this regard, incoming phone calls can be automatically routed to the VoIP telephone, regardless of where a user is connected to the network. Since VoIP is location independent and given that only an Internet connection is typically needed to get a connection to a VoIP provider, call center agents, such as, for example, operators of a telecommunications provider (s), using VoIP telephones can work from anywhere in the world with a reliable and swift Internet connection.

A VoIP carrier may receive voice signals from its subscribers or from subscribers of other carriers. Some of these voice signals may be received with an associated volume level that is sufficient to enable a call agent such as an operator to properly hear the voice data associated with the voice signal (s). On the other hand, some of the voice signals may have an associated volume level that is too low or is insufficient for an operator to adequately hear the associated voice data which may cause an operator to manually adjust the volume level so that the voice data can be adequately heard and recognized.

Additionally, some of the voice signals received by the VoIP carrier may have an associated volume level that is too high for an operator to sufficiently and intelligibly hear the associated voice data. For instance, a volume level that is too high may generate feedback making the voice data difficult to hear and unintelligible, which again may cause an operator to manually adjust a volume level so that the voice data can be adequately heard and recognized. Calls from one carrier may be at different audio levels than calls from another carrier. This often results in the operator manually changing a speaker or earphone volume for almost every received call. Manually adjusting multiple volume levels associated with received calls may be a burdensome task for an operator and may increase the time of a subscribers call resulting in customer dissatisfaction. As such, there is a need for flexible mechanisms to automatically increase or decrease the volume intensity level of voice data associated with voice signals that are supplied to a VoIP carrier by different carriers (e.g., other telecommunications providers).

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

One or more embodiments may be implemented as a method(s), a system(s), a device(s), or a computer program product(s). Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Devices, methods and computer program products for detecting volume levels and adjusting associated output volume levels corresponding to one or more incoming data packets are provided in accordance with various exemplary embodiments. In general, devices, methods and computer program products are described for receiving packetized speech data, determining whether the packetized speech data is being received from a particular carrier, categorizing the speech data as having either a low intensity, a moderate intensity or a high intensity, and based on the categorization applying one or more gain or reduction factors to increase or decrease a volume level associated with the packetized speech.

In certain embodiments referenced herein, a "workstation" or "computing device" may be described. Such a workstation may be, for example, a mainframe, server, desktop, laptop or the like. Additionally, in certain embodiments referenced herein, a "network" or "network system" may be referenced. Such a network system may be considered for example, a personal area network (PAN), a local area network (LAN), a wide area network (WAN), the Internet, etc. Such networks may include one or more devices, such as computers and peripheral devices. The networks may be configured to communicate with one or more external devices, systems, networks, or other sources through one or more interfaces. More specifically, one or more of the computers or peripheral devices may be configured to receive and/or transmit information to or through an external device, system, network, or other external source.

Figure 1:
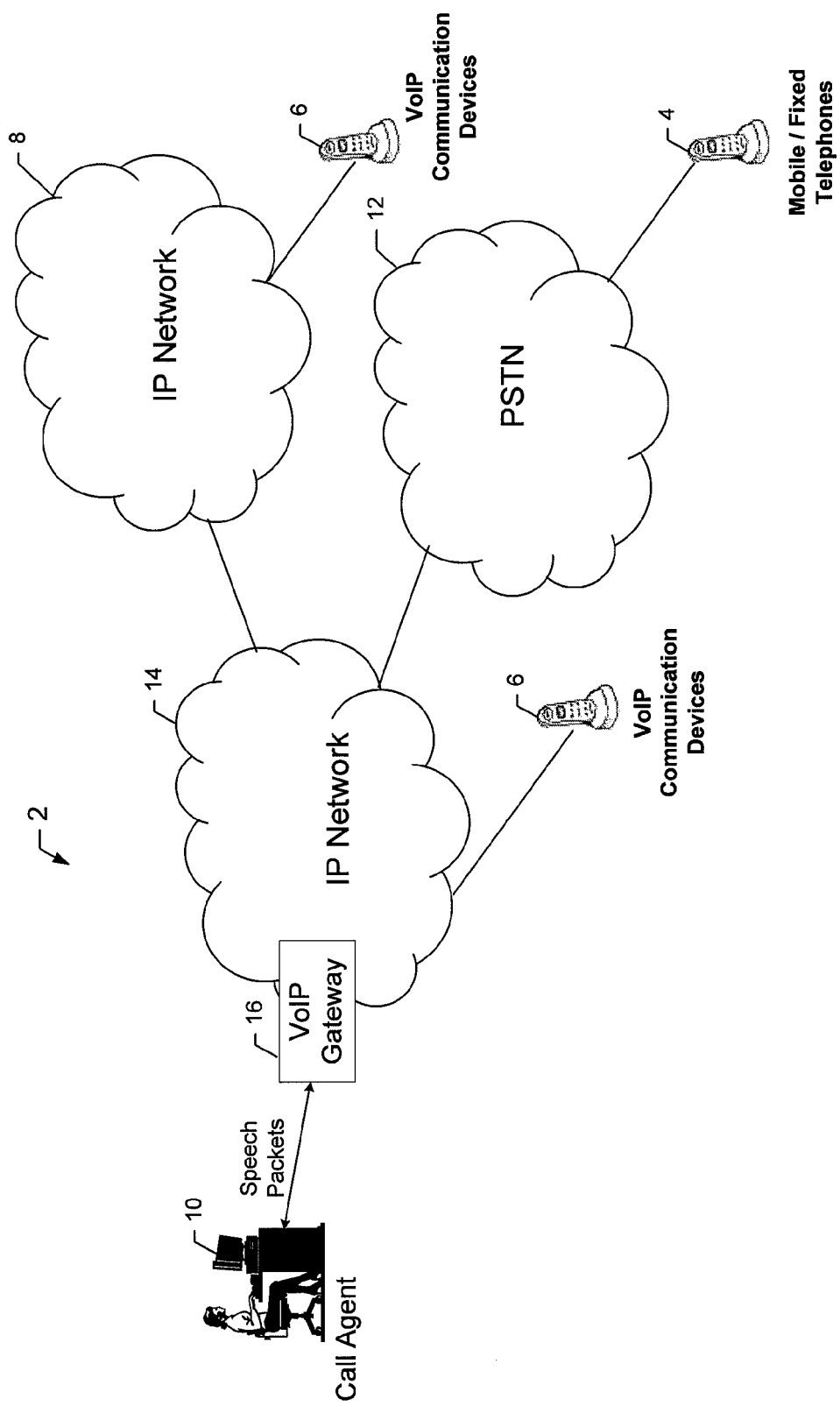
FIG. 1 illustrates one embodiment of a system which facilitates detection and adjustment of volume levels according to an exemplary embodiment.

Referring to FIG. 1, a network 2 may provide communication between a variety of devices, such as between traditional mobile or fixed telephone 4 and VoIP communication devices 6 as well as between traditional mobile or fixed telephone 4 and workstation 10 and VoIP communication devices 6 and workstation 10. The network 2 of FIG. 1 includes two Internet Protocol (IP) networks 8, 14 and at least one Public Switched Telephone Network (PSTN) 12, each of which may be serviced by different carriers or service providers. For instance, the IP network 8 may be serviced by Carrier 2, the IP network 14 may be serviced by Carrier 1 whereas the PSTN 12 may be serviced by Carrier 3. The IP networks 8 and 14 are capable of providing VoIP service to various connected VoIP communication devices 6, including but not limited to traditional phones connecting to the VoIP network via analog telephone adapters, IP phones, or computers running appropriate software to enable the connection with the IP network and the like. The VoIP communication devices 6 are capable of sending data, (in the form of data packets) including but not limited to voice conversations, video conversation, message or data file exchange in parallel with the voice/video conversation, audio conferencing and the like over the IP networks 8, 14. The PSTN 12 is a circuit-switched telephone network that is capable of providing analog or digital service to traditional mobile or fixed telephones 26. The traditional mobile or fixed telephone 26 is capable of transmitting and receiving signals consisting of speech and/or user generated data over the PSTN.

VoIP gateway 16 may be any device or means embodied in hardware and/or software capable of converting circuit-switched data signals, received from a circuit-switched network, (e.g., PSTN 12) to data packets. Moreover, the VoIP gateway 16 is capable of converting or encoding these data packets into μ-law encoded Real-time Transport Protocol (RTP) data packets, for example, by employing a μ-law algorithm as is well known and sending these RTP data packets to a packet processor 22 of the workstation 10. (See FIG. 2 and discussion below) Additionally, VoIP gateway 16 is capable of receiving/transmitting data packets from/to IP networks 8, 14 and converting these data packets to μ-law RTP data packets, for example, which may be sent to the processor 22 of the workstation 10. In this regard, the VoIP gateway 16 may operate as a pass-through encoder switch (i.e., a bypass encoder) and as a hub for VoIP data such as, for example, packetized speech data, text data, video data, multimedia data and the like. As referred to herein the RTP defines a standardized packet format for delivering audio and/or video data over packet-based networks such as IP networks 8, 14.

Workstation 10 may be a computer or computing device such as a mainframe, server, desktop, laptop, device or the like having a processing element (such as for example, processor 22 (also referred to herein as packet processor)) configured to receive μ-law encoded RTP data packets via VoIP gateway 16 from one or more networks corresponding to one or more different carriers (e.g., Carrier 1, Carrier 2 and Carrier 3). The μ-law RTP data streams are capable of including speech data, associated with a voice of one or more users upon making a telephone call with traditional mobile or fixed telephone 4 or VoIP communication device 6, which may have different volume levels corresponding to one or more of the different carriers. According to an exemplary embodiment, the volume levels of various carriers (e.g., Carriers 1, 2 & 3) may range from "0" to "1." However, it should be noted that the volume levels of the carriers may consist of any suitable volume level(s) set or established by the respective carrier. In this exemplary embodiment, the processor 22 of the workstation 10 may be provided information identifying a particular network carrier. For example, the processor could be provided information identifying a particular network carrier. For examine, the processor could be provided with an explicit carrier identifier, which was obtained when the call was processed by the IP network.

As an exemplary application of the above discussion, a user (e.g., subscriber of PSTN 12, i.e., Carrier 3) of traditional mobile or fixed telephone 4 may make a phone call (such as, for example, by dialing a telephone number for local directory assistance, e.g., 4-1-1) to a call agent (also referred to herein as a directory assistance operator) at workstation 10 of IP network 14 (i.e., Carrier 1). (In this regard, Carrier 3 may subscribe to Carrier 1 for service, in this example local directory assistance such as e.g., 4-1-1.) Voice signals associated with this phone call may be sent to a circuit-switched network such as PSTN 12, which may route the call to VoIP gateway 16 of network 14. Typically, many of the voice signals conveyed by circuit-switched networks in the PSTN are converted from analog signals into digitized voice signals. The VoIP gateway then converts the circuit-switched data signals to data packets. As noted above, the VoIP gateway 16 is capable of converting or encoding these digitized voice signals to μ-law RTP data packets that are provided to the packet processor 22 of workstation 10. These μ-law RTP data packets may have a predetermined volume level associated with a corresponding carrier, in this example Carrier 3, which may have, for example, a volume level of "0.6." (See table 18 of FIG. 2)

Additionally, a user (i.e., subscriber of IP network 8 (i.e., Carrier 2)) of VoIP communication device 6 may also make a phone call (such as, for example, by dialing a telephone number for local directory assistance, e.g., 4-1-1) to a call agent at workstation 10 of IP network 14 (i.e., Carrier 1). (In this regard, Carrier 2 may subscribe to Carrier 1 for service, in this example local directory assistance such as e.g., 4-1-1.) Voice signals associated with this phone call may be sent to a packet-based network such as IP network 8, which may convert the voice signals into digital data in the form of data packets and may send these data packets to VoIP gateway 16 of IP network 14 which is capable of converting or encoding these data packets to μ-law RTP data packets, for example, that are provided to the packet processor 22 of workstation 10. These μ-law RTP data packets may include speech data having a predetermined volume level associated with a corresponding carrier, in this example Carrier 2, which may have, for example, a volume level of "0.8." (See table 18 of FIG. 2)

Additionally or alternatively, a user (i.e., subscriber of IP network 14 (i.e., Carrier 1)) of VoIP communication device 6 may likewise make a phone call (such as, for example, by dialing a telephone number for local directory assistance, e.g., 4-1-1) to a directory assistance operator (i.e., call agent) at workstation 10 of IP network 14. Voice signals associated with this phone call may be sent to a packet-based network, (such as, for example, IP network 14) which may convert the voice signals into digital data in the form of data packets and may send these data packets to VoIP gateway 16 of IP network 14 which is capable of converting or encoding these data packets to μ-law RTP data packets, for example, that are provided to the packet processor of Workstation 10. These μ-law RTP data packets may include speech data having a predetermined volume level associated with a corresponding carrier, in this example Carrier 1, which may have, for example, a volume level of "0.7." (See Table 18 of FIG. 2)

It should be understood that any number of networks (such as, for example, IP networks and PSTNs) and carriers could be part of the network system 2. As such, the IP networks 8, 14 and the PSTN 12 and Carriers 1, 2 and 3 of FIG. 1 are merely illustrative in nature. For example, in a manner analogous to that described above, μ-law RTP data packets associated with a phone call generated by a user/subscriber of a carrier, e.g., Carrier 4, (not shown) may include speech data having a predetermined volume level such as, for example, a volume level of "0.8." (See Table 18 of FIG. 2) Additionally, it should be understood that any number of traditional mobile or fixed telephones 4 and VoIP communication devices 6 may be employed in the network system 2.

Figure 2:
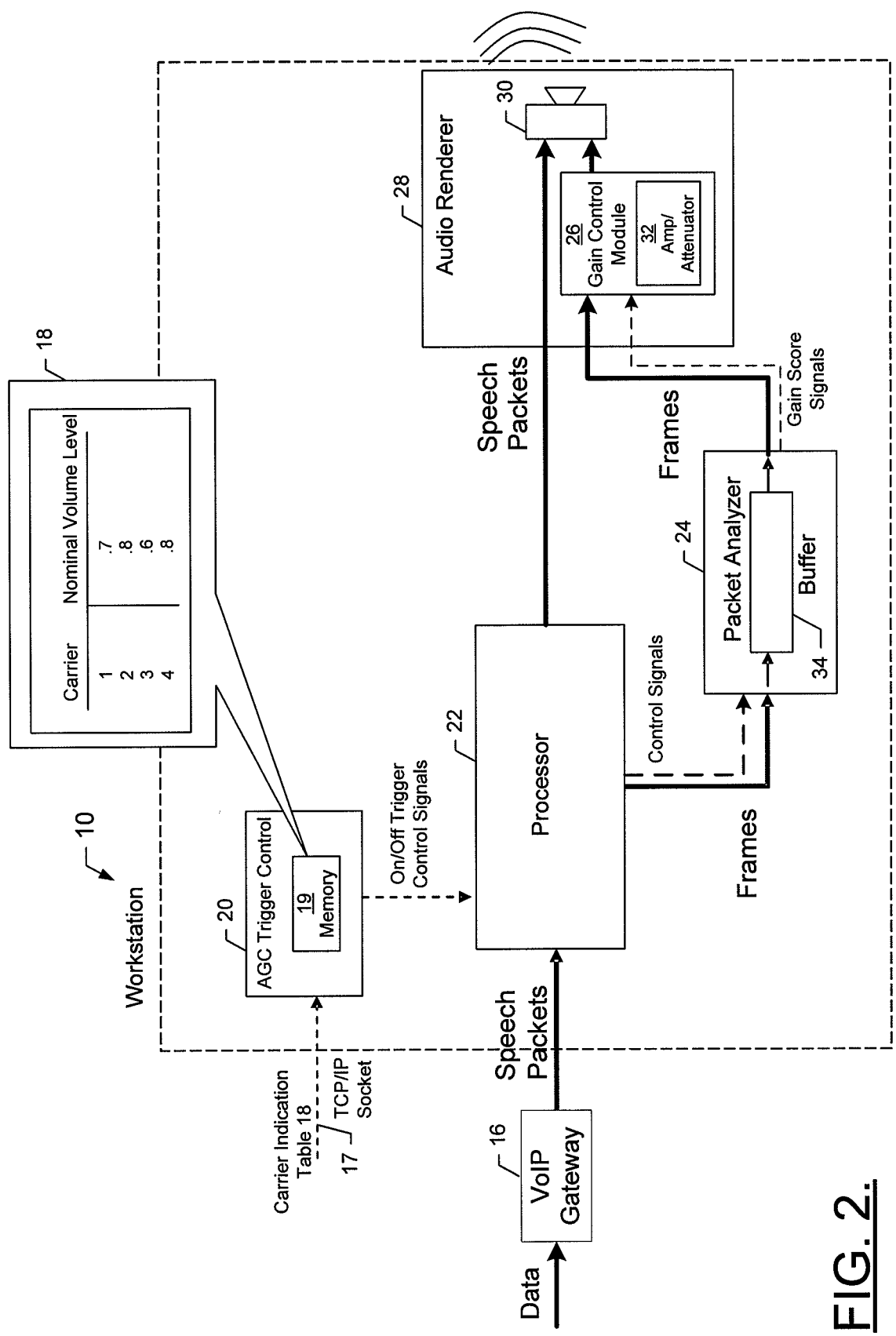
FIG. 2 illustrates one embodiment of a block diagram of an apparatus for detecting and adjusting volume levels according to an exemplary embodiment.

Referring now to FIG. 2, a workstation 10 for detecting and adjusting volume levels associated with data packets generated by one or more carriers is illustrated. In FIG. 2, solid lines input to elements and located between elements denote speech data and/or audio data paths (collectively referred to herein as "Speech Packets") whereas dotted lines input to and located between elements denote signaling and/or control information. The workstation 10 includes a TCP/IP socket 17, an Automatic Gain Control (AGC) trigger control 20, a memory 19, a carrier indication table 18, a processor 22 (also referred to herein as packet processor), a packet analyzer 24, an audio renderer 28, which includes a speaker 30 and a gain control module 26 having a sound adjusting device 32 including an amplifier and an attenuator. The TCP/IP socket 17 may be any device or means embodied in hardware and/or software that is capable of sending or receiving data stream, such as for example data packets, between multiple devices or end points. In this exemplary embodiment, a call agent may load the carrier indication table 18 into the memory 19 of the AGC trigger control 20 via the TCP/IP Socket 17. The memory 19 may be a Random Access Memory (RAM) for storage of data or any number of pieces of information used by the workstation 10 to implement the functions of the AGC trigger control 20. For example, the memory 19 may store the carrier indication table 18 input by the call agent.

The AGC trigger control 20 may be any device or means embodied in software and/or hardware capable of evaluating data packets, for example, data packets consisting of carrier identification data, which can be conveyed using any variety of protocol formats. (In an alternative exemplary embodiment, the AGC trigger control 20 may be a co-processor capable of evaluating data packets received by the packet processor 22 and determining a carrier associated with one or more data packets based on a MIN included in the data packets as well as performing the other functions described herein below.) The AGC trigger control 20 is also capable of examining the carrier indication table 18 stored in memory 19 and determining a nominal volume level associated with speech data included in the data packets that are received by the workstation 10 from a respective carrier(s) when a phone call is made by a user of the traditional mobile or fixed telephone 4 or the VoIP communication device 6. The AGC trigger control 20 is able to examine the carrier indication data within the data packets received by the workstation 10, (which were originated and sent by a respective carrier (e.g., Carrier 1) and utilize this carrier indication data to determine a respective carrier (e.g., Carrier 1) of the data packets. Once, the AGC trigger control 20 determines the carrier of the data packets, the AGC trigger control 20 is capable of evaluating the carrier indication table 18 to determine a corresponding nominal volume level (e.g., 0.7) associated with the carrier (e.g., Carrier 1). As referred to herein, a nominal volume level(s) may consist of a theoretical (e.g., expected) volume level(s) associated with data packets carrying audio data generated by a respective carrier and do not necessarily reflect the actual volume levels associated with the audio data in the data packets generated by the carrier.

Based on the nominal volume level of the carrier, the AGC trigger control 20 may activate or turn a trigger "ON," which generates a trigger control signal (also referred to herein as "ON trigger control signal") that is sent to the processor 22. The ON trigger control signal may include data indicating to the processor 22 that reduction factors or gain factors might need to be applied to a volume level associated with audio data in received data packets that are generated by a respective carrier. In this regard, the "ON trigger control signal" may serve as a notification to the processor 22 that a determination regarding whether reduction factors or gain factors should be applied to a volume output level corresponding to the audio in the data (originated and sent by a respective carrier) needs to be performed. Additionally, based on the nominal volume level of the carrier, the AGC trigger control 20 may activate or turn a trigger "OFF," (also referred to herein as "OFF trigger control signal") which is a trigger control signal that is sent to the processor 22 and contains data indicating that no gain factors or reduction factors should be applied to the audio data in the data received by the workstation 10 and originated and sent by a respective carrier.

For instance, the AGC trigger control 20 may determine to activate or turn a trigger "ON" when it determines that a nominal volume level of a carrier is not at a baseline volume level. In this exemplary embodiment, the baseline volume level is a volume level of 0.7. However, it should be pointed out that any suitable volume level may be established or set as the baseline volume level. The baseline volume level indicates a volume level associated with a volume corresponding to audio data and/or speech data that is sufficient for a call agent to hear and intelligibly understand. (For example, tests may be performed with various call agents to determine that a volume level associated with speech data and/or audio data is sufficient for a call agent to hear and intelligibly understand. Based on the results of these tests the baseline volume level may be established.) A communications provider, such as, for example, the provider of IP network 14, (i.e., Carrier 1) may establish or set the baseline volume level. Additionally, a call agent of the communications provider (e.g., provider of IP network 14 (i.e., Carrier 1)) may establish or set the baseline volume level.

If the AGC trigger control 20 determines that a nominal volume level (e.g., 0.6) of a carrier is below the baseline volume level, (e.g., "0.7") the AGC trigger control 20 may activate or turn a trigger "ON," in the manner discussed above. In this exemplary embodiment, when the AGC trigger control 20, determines that the volume level (e.g., 0.6) of the carrier is below the baseline volume level, (e.g., 0.7) the "ON trigger control signal" may be sent to the processor 22. The ON trigger control signal that is provided to the processor 22 also includes data associated with the nominal volume level (e.g., 0.6) of the carrier and may include data consisting of a notification (also referred to herein as notification data) which notifies the processor 22 that a determination regarding whether gain factors or reduction factors should be applied to an output volume level associated with audio data in received data packets (arising from data sent from and originated by a respective carrier) needs to be performed.

On the other hand, when the AGC trigger control 20, determines that the nominal volume level (e.g., 0.8) of a carrier is above the baseline volume level, (e.g., 0.7) the AGC trigger control 20 may activate or turn a trigger "ON," which may consist of a trigger control signal (i.e., "ON trigger control signal") that is sent to the packet processor 22. This ON trigger control signal also may include data associated with the nominal volume level (e.g., 0.8) of the carrier and also includes data consisting of a notification (i.e., notification data) which notifies the processor 22 that a determination regarding whether gain factors or reduction factors should be applied to an output volume level associated with audio data in received data packets (sent from and originated by a respective carrier) needs to be performed. Moreover, if the AGC trigger control 20 determines that the volume level of a carrier is the same as the baseline volume level, (e.g., 0.7) (or within a predetermined threshold or range of the baseline volume level) the AGC trigger control 20 may activate or turn a trigger "OFF," which may consist of a trigger control signal (i.e., the "OFF trigger control signal") that is sent to the packet processor 22. The OFF trigger control signal may include data associated with the nominal volume level (e.g., 0.7) associated with the received audio data in data packets arising from data sent from a respective carrier and instructs the processor 22 to send the audio data, associated with the data packets sent by the carrier, to the audio renderer 28, which outputs the audio associated with the speech data to speaker 30 without applying any gain factors or reduction factors. In this regard, the speech data associated with the data packets sent by a carrier, determined to have a nominal volume level of 0.7 are played by the speaker 30 without adjusting the volume level.

The processor 22 includes circuitry required for implementing logic and audio functions of the workstation 10. For example, the processor may include a microprocessor, a digital signal processing device and other supporting circuits. Additionally, the processor 22 may include the capability to operate or execute one or more software programs that may be stored in memory. The processor 22 is capable of receiving μ-law RTP data packets from the VoIP gateway 16 and determining the start and end of audio data and/or speech data included in one or more μ-law RTP data packets that may, for example, be associated with voice conversation or other audio data such as, for example, generic response system (GRS) voice messages. In this regard, the processor 22 is capable of sensing the boundaries of a speech pattern, such as for example, the start and end of voice data associated with a telephone call. The processor 22 is further capable of converting the μ-law RTP data packets into a form that is audible to a user via the audio renderer 28. For example, the processor 22 is capable of converting the μ-law RTP data packets into a waveform audio format (WAV) (which is an audio file format standard for storing audio on computers) or a Moving Picture Experts Group-1 (MPEG-1) Audio Layer 3 (MP3) (i.e., another audio file format standard for storing audio on computers) file format and the like which enables audio to be played by a speaker 30 of the audio renderer 28 and heard by a user(s) such as for example, a directory assistance operator (i.e., call agent).

As noted above, the processor 22 is further capable of receiving trigger control signals such as "ON trigger control signals" and "OFF trigger control signals" from the AGC trigger control 20. When the processor 22 receives an ON trigger control signal from the AGC trigger control 20, and the corresponding notification, (i.e., the notification data which notifies the processor 22 that a determination regarding whether gain factors or reduction factors should be applied to a volume level needs to be performed) the processor 22 may send a control signal to the packet analyzer 24, which instructs the packet analyzer 24 to monitor data packets (e.g., audio/speech data packets) originated and generated by a corresponding carrier (e.g., Carrier 1, Carrier 2 or Carrier 3) for a predetermined time and instructs the packet analyzer to determine whether gain factors or reduction factors should be applied to a volume level (in the manner discussed below) associated with data packets containing audio data and/or speech data. In this exemplary embodiment, the predetermined time may be 60 ms. However, it should be noted that any suitable time for monitoring the data packets may be established by the carrier.

Additionally, as noted above, when the processor 22 receives an "OFF trigger control signal," the processor 22 is capable of sending data packets including but not limited to speech data packets and/or audio data packets, associated with a carrier to the audio renderer 28, which outputs audio associated with the speech/audio data to speaker 30 which plays the corresponding audio so that one or more users such as, for example, the call agent can hear and intelligibly understand the audio.

The processor 22 is further capable of arranging the received μ-law data packets (e.g., RTP data packets) into one or more frames and is capable of sending these frames (which include the data packets containing speech and/or audio data, associated with a call(s) that is generated by one or more carriers) to the packet analyzer 24. Moreover, it should be pointed out that these frames which include the data packets consisting of audio data and/or speech data sent from the processor 22 to the packet analyzer 24 contain data indicating associated volume levels that may be determined by the packet analyzer 24, in the manner described below. The packet analyzer 24 may be any means or device embodied in hardware and/or software (or a combination of hardware and software) capable of receiving control signals and frames, consisting of data packets, sent from the processor 22. In this exemplary embodiment, the packet analyzer 24 is located external to the processor 22. However, in an alternative exemplary embodiment, the packet analyzer 24 may be located internal to the processor 22 and is thereby embodied by the processor 22. (In another exemplary alternative embodiment, the packet analyzer 24 may be a co-processor capable of receiving control signals and frames, consisting of data packets, sent from the processor 22 and performing the functions described herein below.)

The packet analyzer 24 includes a buffer 34, which is capable of storing the frames received by the packet analyzer 24. The buffer 34 may be any means or device embodied in either hardware (e.g., a storage medium) or software capable of temporarily storing or holding the frames prior to the frames being sent to the audio renderer 28. The packet analyzer 24 is capable of monitoring the frames stored in the buffer 34 for a predetermined amount of time, for example 60 ms, and determining whether reduction or gain factors should be applied to a volume level associated with data packets sent from a respective carrier when a user of the VoIP communication device 6 or the traditional mobile/fixed telephone 4 makes a phone call to the call agent of IP network 14 (i.e., Carrier 1). In this exemplary embodiment, the predetermined time corresponds to three frames, where each frame may be comprised of 160 bytes or 20 ms of audio data denoting a packetization interval of 20 ms. (It should be pointed out, however, that a predetermined time of 60 ms corresponding to three frames is merely an example for illustration purposes and any suitable time period for monitoring frames may be selected and used.) In this exemplary embodiment monitoring and averaging three frames is a sufficient amount of time for the packet analyzer 24 to determine if corresponding speech data and/or audio data (e.g., voice data, such as, for example, the beginning or a voice conversation) meets or exceeds a predetermined threshold such as the baseline volume level. However, other suitable averages of frames may be utilized herein.

The packet analyzer 24 is capable of calculating a frame average of all data in a frame and is further capable of repeating a frame average calculation for three frames i.e., for the 60 ms of audio data at 20 ms per packet. (As noted above, the packet analyzer 24 may calculate a frame average over any number of suitable frames and the calculation of a frame average over three frames is merely one example of a frame average calculation) In order to determine the volume level associated with data packets in the frames, the packet analyzer 24 may evaluate the data packets in each frame and determine that data packets having data corresponding to values close (e.g., within a ±0.002 tolerance range) to a predetermined value (e.g., "0" or "0XFF" (hexadecimal) or the like) indicate a minimum amplitude, corresponding to a minimum volume level, whereas data packets having data corresponding to values close (e.g., within a ±0.002 tolerance range) to a different predetermined value (e.g., "1" or "00" (hexadecimal) or the like) indicates a maximum amplitude corresponding to a maximum volume level.

The packet analyzer 24 is further capable of using the results from a three frame average(s) to score or categorize signals corresponding to the data packets in the three frames. For example, when the three frame average reveals that the volume level of corresponding data packets is above a baseline volume level, (e.g., 0.7) the packet analyzer 24 is capable of scoring or categorizing the speech data and/or audio data associated with the three frames as "high intensity." The packet analyzer 24 is then capable of determining a reduction factor which is a factor that reduces the volume level associated with the signals within the data packets of the three frames. For instance, when the packet analyzer 24 scores or categorizes the three frames as high intensity, it may select a predetermined value, for example a predetermined percentage, (e.g., 30%) by which to reduce a volume level corresponding to the speech/audio data in the data packets of the three frames. The packet analyzer 24 may generate a gain-score signal containing the predetermined value that is sent to the gain control module 26 and which instructs the gain control module 26 to reduce a volume level at the speaker 30, associated with the volume of the speech/audio data in the data packets of the three frames, by the predetermined value (e.g., by 30%). In this regard, the volume level at the speaker 30 is reduced without actually attenuating the signals (i.e., without reducing the amplitude and intensity of the signals) associated with the data packets in the three frames. In other words, the signals associated with data in the data packets remain unchanged.

The packet analyzer 24 is also capable of sending the data packets stored in the buffer 34 to the audio renderer 28. More particularly, when the packet analyzer 24 scores or categorizes the data packets as high intensity, the packet analyzer 24 is capable of sending the frames having the data packets to the sound adjusting device 32 of the gain control module 26 which reduces the volume level (via the attenuator) associated with the data packets. The frames having the data packets stored in the buffer 34 may be sent to the audio renderer 28 immediately after the gain score signal consisting of the predetermined value is sent to the gain control module 26. However, in an alternative exemplary embodiment, the frames stored in the buffer 34 may be sent to the audio renderer 28 simultaneously with the sending of the gain score signal(s) that is sent to the gain control module 26.

Once one of the frames (e.g., the oldest frame received) stored in the buffer 34 are moved from the buffer 34 and sent to the audio renderer 28, the packet analyzer may store data packets associated with a newly received frame in the buffer 34 such that there are three frames stored in buffer 34 and repeat the process above. For instance, the packet analyzer 24 may perform a three frame average on these three new frames stored in buffer 34 and when a value (e.g., 0.6) of the three frame average is below a baseline volume level (e.g., 0.7), the packet analyzer 24 may score or categorize the speech data and/or audio data associated with the three frames as "low intensity." The packet analyzer 24 is then capable of determining a gain factor, which is a factor that increases a volume level associated with speech/audio data in the data packets of the new frames stored in the buffer 34. For instance, when the packet analyzer 24 scores or categorizes the three newly stored frames as low intensity, the packet analyzer may select a predetermined value, for example a predetermined percentage, (in this example 30%) by which to increase a volume level corresponding to the speech/audio data in the data packets of the three frames. The packet analyzer 24 may generate a gain score signal(s) containing the predetermined value that is sent to the gain control module 26 which instructs the gain control module 26 to increase a volume level at the speaker 30, associated with the volume of the speech/audio data in the data packets of the three frames, by the predetermined value (in this example by 30%). In this regard, the volume level at the speaker 30 is increased without actually amplifying the signals (i.e., without increasing the intensity of the signals) associated with the data packets in the three frames. In other words, the signals of the data packets (in the three frames) stored in buffer 34 remain unchanged.

As noted above, the packet analyzer 24 is also capable of sending one (e.g., the oldest received frame, also referred to herein as frame stored the longest in buffer 34) of the frames contained within the buffer 34 to the audio renderer 28 and when the packet analyzer 24 scores or categorizes the data packets as low intensity, the packet analyzer 24 is further capable of sending the data packets to the sound adjusting device 32 (of the gain control module 26) which increases the volume level, (via the amplifier) corresponding to the data packets, at the speaker 30. The frame stored the longest within buffer 34 may be sent to the audio renderer 28 immediately after the gain score signal having the predetermined value is sent to the gain control module 26. As noted above, in an alternative exemplary embodiment, the frame stored the longest in the buffer 34 may be sent to the audio renderer 28 simultaneously with the sending of the gain score signal(s) that is sent to the gain control module 26.

Again, once the frames which include the data packets stored in the buffer 34 are moved from the buffer 34 and sent to the audio renderer 28, the packet analyzer 24 may store data packets associated with three newly received frames in the buffer 34 and repeat the process above. For instance, the packet analyzer 24 may perform another three frame average on these three newly received frames stored in buffer 34 and when a value (e.g., 0.7) of the three frame average is the same as or within a predetermined range, ±0.002) of the baseline volume level, (e.g., 0.7) the packet analyzer 24 may score or categorize the speech data and/or audio data associated with these three frames as "moderate intensity." In this regard, scoring or categorizing the three frames as moderate intensity based on the three frame average being within a predetermined range of the baseline volume level signifies that the volume level of the data packets in the three frames corresponding to the speech data and/or audio data is deemed to be sufficient for a call agent (e.g., directory assistance operator) to hear and intelligibly understand the corresponding sound. As noted above, the baseline volume level may be determined by performing various tests with one or more call agents.

When the packet analyzer 34 scores or categorizes the speech data and/or audio data associated with the three frames as moderate intensity, a frame (e.g., the oldest received frame) consisting of the corresponding speech data and/or audio data may be moved from buffer 34 and sent (by the packet analyzer 24) to the speaker 30. Upon receipt of the frame sent by the packet analyzer 24, the speaker 30 plays the corresponding speech data and/or audio data of the data packets at a volume level associated with a value of the three frame average (for example within a predetermined tolerance of 0.7). In other words, the speaker 30 plays the speech data and/or audio data based on the volume level of the data packets in the three frames without increasing or decreasing a volume level associated with the data packets in the three frames. As noted above, the packet analyzer 24 may repeat the above process, upon storing a newly received frame in the buffer 34, such that the buffer stores three frames, and upon determining whether the three frame average should be scored or categorized as high intensity, low intensity, or moderate intensity in the manner described above. When there are no more frames received by the packet analyzer 24 from the processor 22 and no more data packets are stored in buffer 34, the packet analyzer 24 may determine that a call (e.g., a call initiated by a user of the VoIP communication device 6 or the traditional mobile/fixed telephone 4) has ended or is complete and the packet analyzer 24 may send a gain score signal(s) to the gain control module 26 instructing the gain control module 26 to send a gain score signal(s) to the sound adjusting device 32 to reset a volume level of the speaker 30 to a baseline volume level (e.g., 0.7).

The gain control module 26 may be any device or means embodied in hardware and/or software capable of receiving gain score signals from the packet analyzer 24 and generating one or more reduction factors as well as one or more gain factors identified in the data of the gain score signals received from the packet analyzer 24. The gain control module 26 is further capable of transmitting the reduction factors as well as the gain factors to the sound adjusting device 32, in a manner analogous to that discussed above. The sound adjusting device 32 includes an amplifier and an attenuator. When the sound adjusting device 32 receives a gain score signal(s) from the packet analyzer 24 including data relating to a reduction factor, the sound adjusting device 32 invokes the attenuator to reduce a volume level at the speaker 30 corresponding to speech data and/or audio data in the data packets of the frames received by the audio renderer 28. Similarly, when the sound adjusting device 32 receives a gain score signal(s) from the packet analyzer 24 including data relating to a gain factor, the sound adjusting device 32 invokes the amplifier to increase a volume level at the speaker 30 corresponding to speech data and/or audio data in the data packets of the frames received by the audio renderer 28.

The speaker 30 may be any device or means embodied in hardware capable of receiving signals associated with the data packets in the frames, received by the audio renderer 28, which are converted into sound and played so that a user such as a call agent (e.g., directory assistance operator) can hear the corresponding sound. In the exemplary embodiment, the speaker 30 is located internal to the audio renderer 28. However, in an alternative exemplary embodiment, the speaker 30 may be located external to the audio renderer 28. In this alternative exemplary embodiment, the speaker 30 may consist of an earpiece, earphone, headphone, headset or the like.

As discussed above, the baseline volume level may be determined by performing various tests with one or more call agents. Additionally, the baseline volume level may be increased or decreased based on a user's preferences, such as for example, the preferences of the call agent (i.e., directory assistance operator). For instance, the baseline volume level may be set by the call agent based on the call agent's hearing conditions. In this regard, if the call agent is hearing impaired this call agent may set a baseline volume level (e.g., 0.8) which is higher than a baseline volume level (e.g., 0.7) which is deemed sufficient for a call agent that is not hearing impaired. The call agent may set or change the baseline volume level in the carrier indication table 18 prior to loading the carrier indication table 18 into the AGC trigger control 20. Moreover, the baseline volume level may be adjusted by the provider of IP network 14 (i.e., Carrier 1) or the call agent based on different types of workstations 10. For instance, if the workstation 10 consists of a desktop computer a certain baseline volume level (e.g., 0.7) may be selected whereas if the workstation 10 consists of a laptop computer a different baseline volume level (e.g., 0.8) may be selected. Again, these baseline volume level selections may be made by the call agent in the carrier indication table 18 prior to being loaded into AGC trigger control 20. In this regard, the corresponding volume levels may be increased or decreased on the basis of the hearing conditions of a particular call agent or a particular type of workstation 10, without requiring the call agent to manually change the volume level of a speaker for received calls.

To illustrate the operation of the system for detecting and adjusting volume levels according to exemplary embodiments of the present invention, consider the following exemplary scenarios. A user such as a call agent may load a carrier indication table 18 into a memory 19 of the AGC trigger control 20 via TCP/IP socket 17. When a user of the VoIP communication device 6 initiates a phone call, via a packet-based network such as for example, IP network 14, (e.g., Carrier 1) data packets associated (e.g., voice data, such as for example data relating to a voice conversation) with the call may be sent to the VoIP gateway 16, which converts these data packets to μ-law RTP data packets, for example. The VoIP gateway 16 may send these converted data packets to the processor 22. The AGC trigger control 20 is capable of indicating which carrier provided the call. For instance, the AGC trigger control 20 uses the carrier identification data to look up the associated nominal volume level (e.g., 0.7) of the carrier in the carrier indication table 18.

In this example, since the nominal volume level (e.g., 0.7) of Carrier 1 is equal to a baseline volume level, (e.g., 0.7) the AGC trigger control 20 transmits a trigger control signal such as an OFF trigger control signal that is received by the processor 22. The OFF trigger control signal may instruct the processor 22 to send the speech and/or audio data (e.g., voice data, such as for example a voice conversation), associated with the data packets (which corresponds to data (e.g., voice signals) originated by the carrier (e.g., Carrier 1)), to the audio renderer 28, which outputs the speech and/or audio data to speaker 30 without applying any reduction or gain factors. The speaker 30 converts the signals of the data packets into sound and plays the sound at a volume level corresponding to the baseline volume level (e.g., 0.7) (or within a predetermined tolerance range (e.g., ±0.002) of the baseline volume level) such that the data in the data packets is audible and may be heard and intelligently understood by a user such as a call agent. When the speaker 30 finishes playing the sound, (i.e., when the call is complete) the volume level of the speaker 30 remains at the baseline volume level. In cases in which the volume level of data originated by the carrier is not equal to or within a predetermined tolerance of the baseline volume level, when the speaker 30 finishes playing the sound, (i.e., when the call is complete) the volume level of the speaker 30 is reset to the baseline volume level (e.g., 0.7) by the sound adjusting device 32 in the manner discussed above.

When a user of the VoIP communication device 6 initiates a phone call, via a packet-based network such as for example, IP network 8, (e.g., Carrier 2) to IP network 14, (e.g., Carrier 1) data packets associated (e.g., voice data, such as for example data relating to a voice conversation) with the call may be sent to the VoIP gateway 16 of the IP network 14, which converts these data packets to μ-law RTP data packets, for example. The VoIP gateway 16 may send these converted data packets to the processor 22. The AGC trigger control 20 determines the carrier (e.g., Carrier 2) of data based on carrier indication data included in the data packets and looks up the associated nominal volume level (e.g., 0.8) of the carrier in the carrier indication table 18.

In this example, since the nominal volume level (e.g., 0.8) of Carrier 2 is above the baseline volume level (e.g., 0.7) the AGC trigger control 20 transmits a trigger control signal such as an ON trigger control signal that is received by the processor 22. As discussed above, the ON trigger control signal includes data associated with the nominal volume level (e.g., 0.8) of the carrier (i.e., Carrier 2) and data consisting of a notification to the processor 22 that a determination regarding whether gain or reduction factors should be applied to a volume output level corresponding to audio data in the data packets corresponding to the call (i.e., arising from data originated and sent by a respective carrier, in this example Carrier 2) needs to be performed. As such, the processor 22 may send a control signal to the packet analyzer 24 which instructs the packet analyzer to monitor data packets originated and sent from IP network 8 (i.e., Carrier 2) for a predetermined time (i.e., a moving window of a fixed time period e.g., 60 ms) and instructs the packet analyzer 24 to determine whether gain or reduction factors should be applied to the volume level associated with data packets containing audio data and/or speech data. In this example, the predetermined time may be a moving window of 60 ms corresponding to three 20 ms frames where each 20 ms frame contains 160 bytes. However, any suitable time for monitoring the data packets may be established by the carrier. Additionally, the processor 22 is capable of arranging the μ-law data packets, (e.g., RTP data packets) received from the VoIP gateway 16, into one or more frames and is capable of sending these frames to the packet analyzer 24.

The packet analyzer 24 stores a number of frames (in this example three) in the buffer 34 and calculates a frame average of all data in the frames (e.g., for 60 ms of audio data). The packet analyzer 24 uses the results of the three frame average to score or categorize signals corresponding to the data packets in the three frames. For instance, when the three frame average reveals that the volume level (i.e., 0.8 in this example) of corresponding data packets, originated from IP network 8, is above a baseline volume level, (i.e., 0.7 in this example) the packet analyzer 24 may score or categorize the three frames as high intensity and may determine a reduction factor which reduces the volume level associated with the signals within the data packets of the three frames. For example, when the packet analyzer 24 scores or categorizes the three frames as high intensity, it may select a predetermined value, such as a predetermined percentage (e.g., 30%) by which to reduce a volume level corresponding to the speech/audio data in the data packets of the three frames. The packet analyzer 24 generates a gain score signal that contains the predetermined value and the packet analyzer sends the gain score signal to the gain control module 26. The gain score signal instructs the gain control module 26 to reduce a volume level at the speaker 30, associated with the volume of the speech/audio data in the data packets of the three frames, by the predetermined value (e.g., by 30%). In this regard, the gain control module 26 sends a gain score signal to the attenuator of the sound adjusting device 32 to reduce the volume level of the speech and/or audio data, of the data packets in the frames, by the predetermined value (e.g., 30%). The packet analyzer 24 moves the oldest received frame (stored in buffer 34) from buffer 34 and sends this frame to the sound adjusting device 32 and the attenuator reduces the volume level at the speaker 30 based on the predetermined value (e.g., by 30%). In other words, the volume level at the speaker 30 is automatically lowered by a predetermined value, i.e., a reduction factor (e.g., 30%) without requiring a call agent to manually adjust a volume level corresponding to the speaker 30. Once the packet analyzer 20 moves the oldest received frame from buffer 34, the packet analyzer 24 may store a newly received frame in the buffer 34 in a manner analogous to that discussed above, such that there are three frames stored in buffer 34. Again, once all signals associated with the data packets of the frames corresponding to a call are converted to sound by the speaker 30, (i.e., the call is ended) the volume level of the speaker is reset to the baseline volume level by the sound adjusting device.

When data, such as, for example, circuit-switched data signals consisting of voice signals associated with a phone call initiated by a user of the traditional mobile/fixed telephone 4 and originated by PSTN 12 (e.g., Carrier 3) is received by the VoIP gateway 16 of IP network 14, (i.e., Carrier 1) the VoIP gateway 16 may convert the circuit-switched data signals into digital data in the form of data packets (e.g., VoIP data). Additionally, the VoIP gateway 16 may encode these data packets to μ-law RTP data packets (for example) and may send the data packets (e.g., VoIP data) to the workstation 10 so that the packet processor 22 may receive the data packets. The AGC trigger control 20 may evaluate the data packets received by the packet processor 22 and determine a carrier of the data corresponding to the data packets based on the carrier identification information in the data packets and the AGC trigger control 20 may determine an associated nominal volume level (e.g., 0.6) of the carrier (e.g., Carrier 3) by looking up the nominal volume level of the carrier (e.g., Carrier 3) in the carrier indication table 18.

In this example, the AGC trigger control 20 determines that the carrier is Carrier 3 having a nominal volume level of 0.6. Since the nominal volume level of Carrier 3 is less than the baseline volume level, (e.g., 0.7) the AGC trigger control 20 transmits a trigger control signal such as an ON trigger control signal that is received by the processor 22. As pointed out above, the ON trigger control signal includes data associated with the nominal volume level (e.g., 0.6) of the carrier (i.e., Carrier 3) and data consisting of a notification to the processor 22 that a determination regarding whether gain or reduction factors should be applied to a volume output level corresponding to audio data in the data packets corresponding to the call (arising from data originated and sent by a respective carrier, in this example Carrier 3) needs to be performed. As such, the processor 22 may send a control signal to the packet analyzer 24 which instructs the packet analyzer 24 to monitor the data corresponding to the call originated and sent from PSTN 12 (i.e., Carrier 3) for a predetermined time, i.e., a moving window of a fixed time and instructs the packet analyzer 24 to determine whether gain or reduction factors should be applied to the volume level associated with data packets containing audio data and/or speech data. As in the previous scenario, in this example, the moving window time period may be 60 ms corresponding to three 20 ms frames where each 20 ms frame contains 160 bytes. However, any suitable moving window duration for monitoring the data packets may be established by the carrier. Additionally, the processor 22 is capable of arranging the μ-law data packets, (e.g., RTP data packets) received from the VoIP gateway 16, into one or more frames and is capable of sending these frames to the packet analyzer 24.

The packet analyzer 24 stores a number of frames (in this example three) in the buffer 34 and calculates a frame average of all data in the three frames (e.g., for 60 ms of audio data). The three frame average is calculated on a moving window basis. In this regard, when the first three frames (e.g., frame 1, frame 2 and frame 3) are stored in buffer 34, the packet analyzer averages the three frames and outputs the first received frame (e.g., frame 1) to the audio renderer 28. Then when another frame (e.g., frame 4) is received by the packet analyzer 24 and stored in buffer 34, the packet analyzer averages the three frames (e.g., frame 2, frame 3, and frame 4) stored in buffer 34 and sends the oldest received frame (e.g., frame 2) to the audio renderer 28. This process is repeated as long as there are data packets received by the packet analyzer 24 associated with a call. The packet analyzer 24 uses the results of the three frame average to score or categorize signals corresponding to the data packets in the three frames. For instance, when the three frame average reveals that the volume level of corresponding data, originated from PSTN 12, is below (i.e., 0.6 in this example) a baseline volume level, (i.e., 0.7 in this example) the packet analyzer 24 may score or categorize the three frames as low intensity and may determine a gain factor which reduces the volume level associated with the signals within the data packets of the three frames. For example, when the packet analyzer 24 scores or categorizes the three frames as low intensity, the packet analyzer may select a predetermined value, such as a predetermined percentage (e.g., 30%) by which to increase a volume level corresponding to the speech/audio data in the data packets of the three frames. The packet analyzer 24 generates a gain score signal that contains the predetermined value and the packet analyzer 24 sends the gain score signal to the gain control module 26. The gain score signal instructs the gain control module 26 to increase a volume level at the speaker 30, associated with the volume of the speech/audio data in the data packets of the three frames, by the predetermined value (e.g., by 30%). In this regard, the gain control module 26 instructs the amplifier of the sound adjusting device 32 to increase the volume level of the speech and/or audio data, of the data packets in the frames, by the predetermined value (e.g., 30%). The packet analyzer 24 moves the oldest received frame (that is stored in buffer 34) from buffer 34 and sends the this frame to the sound adjusting device 32 and the amplifier (of the sound adjusting device 32) reduces the volume level at the speaker 30 based on the predetermined value (e.g., by 30%). In other words, the volume level at the speaker 30 is automatically increased by a predetermined value, i.e., a gain factor (e.g., 30%) without requiring a call agent to manually adjust a volume level corresponding to the speaker 30. Once the packet analyzer 20 moves the oldest received frame in buffer 34, from buffer 34, the packet analyzer 24 may store a newly received frame in the buffer 34 in a manner analogous to that discussed above, such that three frames are stored in the buffer 34, for example. Again, once all signals associated with the data packets of the frames corresponding to a call are converted to sound by the speaker 30, (i.e., the call is ended) the volume level of the speaker is reset to the baseline volume level by the sound adjusting device 32 in the manner discussed above.

When a user of the VoIP communication device 6 initiates a phone call, via a packet-based network such as for example an IP network, (e.g., Carrier 4) (not shown) to IP network 14, (e.g., Carrier 1) data packets associated (e.g., voice data, such as for example data relating to a voice conversation) with the call may be sent to the VoIP gateway 16 of the IP network 14, which may convert these data packets to μ-law RTP data packets, for example. The VoIP gateway 16 may send these converted data packets to the processor 22 of the workstation 10. The AGC trigger control 20 determines the carrier (e.g., Carrier 4) of data based on the carrier identification data of the data packets in the manner discussed above and looks up the associated nominal volume level (e.g., 0.8) of the carrier in the carrier indication table 18.

In this example, since the nominal volume level (e.g., 0.8) of Carrier 4 is above the baseline volume level (e.g., 0.7) the AGC trigger control 20 transmits a trigger control signal such as an ON trigger control signal that is received by the processor 22. The ON trigger control signal includes data associated with the nominal volume level (e.g., 0.8) of the carrier (i.e., Carrier 4) and data consisting of a notification to the processor 22 that a determination regarding whether gain or reduction factors should be applied to a volume output level corresponding to audio data in the data packets corresponding to the call (i.e., arising from data originated and sent by a respective carrier, in this example Carrier 4) needs to be performed. As such, the processor 22 may send a control signal to the packet analyzer 24 which instructs the packet analyzer to monitor data packets originated and sent from the IP network (i.e., Carrier 4) for a predetermined time and instructs the packet analyzer 24 to determine whether gain or reduction factors should be applied to the volume level associated with data packets containing audio data and/or speech data. In this example, the predetermined time (i.e., a moving window fixed time period) may be 60 ms corresponding to three 20 ms frames where each 20 ms frame contains 160 bytes. However, as noted above any suitable time for monitoring the data packets may be established by the carrier. Additionally, the processor 22 is capable of arranging the μ-law data packets, (e.g., RTP data packets) received from the VoIP gateway 16, into one or more frames and is capable of sending these frames to the packet analyzer 24.

The packet analyzer 24 stores a number of frames (in this example three) in the buffer 34 and calculates a frame average of all data in the frames (e.g., for 60 ms of audio data). The packet analyzer 24 uses the results of the three frame average to score or categorize signals corresponding to the data packets in the three frames. For instance, when the calculation of the three frame average results in a value (e.g., 0.7) that is the same as the baseline volume level (e.g., 0.7) or within a predetermined range (e.g., ±0.002) of the baseline volume level, the packet analyzer 24 may score or categorize the three frames as moderate intensity. In this regard, scoring or categorizing the three frames as moderate intensity based on the three frame average being within a predetermined range of the baseline volume level signifies that the volume level of the data packets in the three frames corresponding to speech data and/or audio data of the data packets are deemed to be sufficient for a call agent to hear and intelligibly understand the corresponding sound played by speaker 30.

When the packet analyzer 34 scores or categorizes the speech data and/or audio data associated with the three frames as moderate intensity, the frames consisting of the corresponding speech data and/or audio data may be moved from buffer 34 and sent (by the packet analyzer) to the speaker 30. Upon receipt of the frames sent by the packet analyzer 24, the speaker 30 plays the sound corresponding to the speech data and/or audio data of the data packets at a volume level associated with a value of the three frame average (in this example within a predetermined range of 0.7). In other words, the speaker 30 plays the speech data and/or audio data based on the volume level (e.g., 0.7) of the data packets in the three frames without adjusting (i.e., without increasing or decreasing) a volume level associated with the data packets of the three frames. When there are no more frames received by the packet analyzer 24 from the processor 22 and no more data packets are stored in buffer 34, the packet analyzer 24 may determine that a call has ended or is complete and the packet analyzer 24 may send a gain score signal(s) to the gain control module 26 instructing the gain control module 26 to send a gain score signal(s) to the sound adjusting device 32 to reset a volume level of the speaker 30 to a baseline volume level (e.g., 0.7).

Figure 3A:
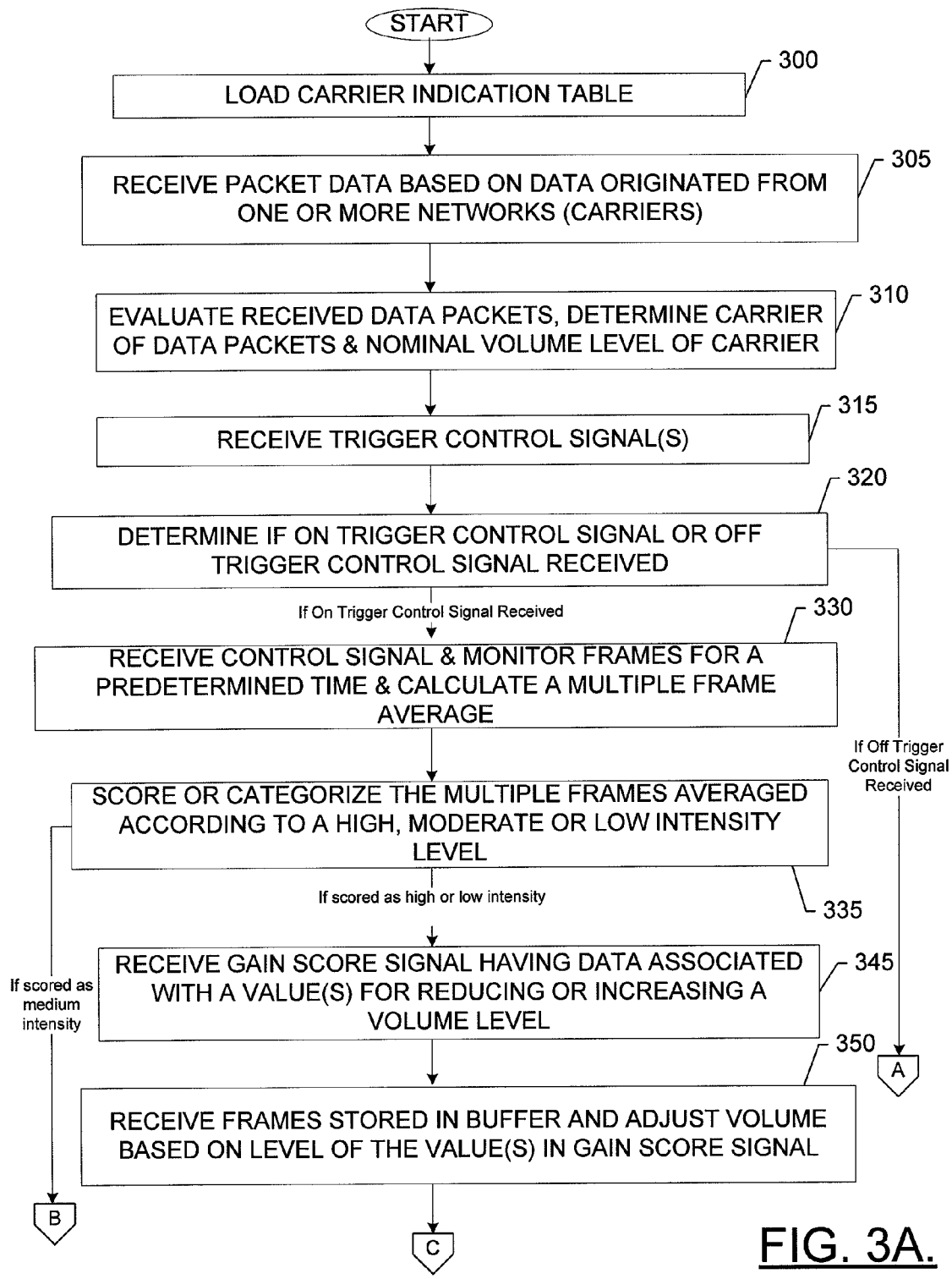
FIGS. 3A & 3B illustrate one embodiment of a flowchart of a method for detecting and adjusting volume levels according to an exemplary embodiment.
Figure 3B:
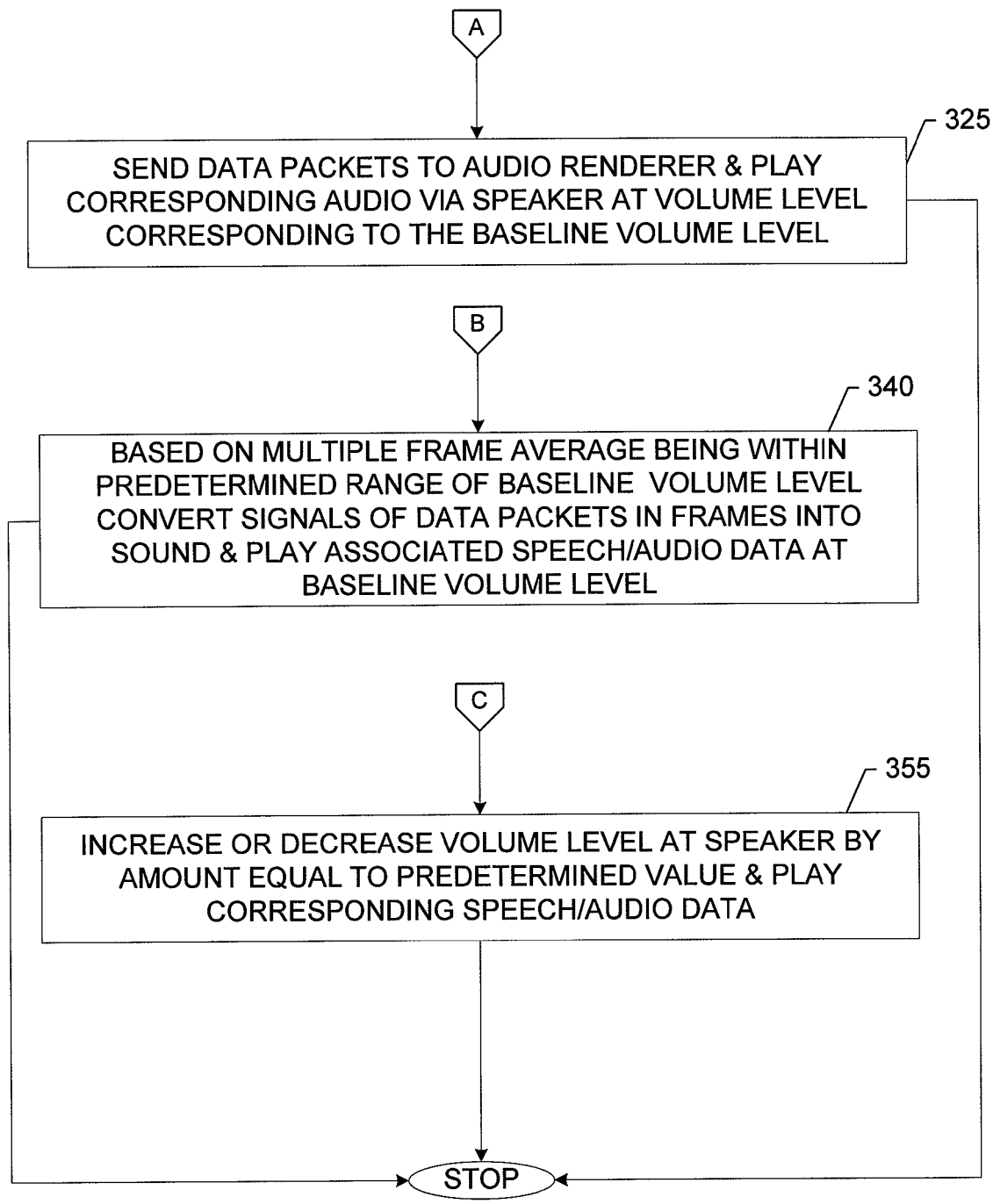

Referring now to FIGS. 3A and 3B, a flowchart illustrating a method of detecting and adjusting volume levels according to an exemplary embodiment is provided. The method includes loading the carrier indication table 18 in a memory 19 of the AGC trigger control 20, at operation 300. At operation 305, the VoIP gateway 16 receives data from one or more networks (e.g., IP network 14, IP network 8 and PSTN 12) or carriers (e.g., Carrier 1, Carrier 2 & Carrier 3, respectively) and converts and/or encodes the data into data packets such as, for example, µ-law RTP data packets and sends the data packets to the workstation 10 so that the processor 22 may receive the data packets. The processor 22 may arrange the received data packets into frames. At operation 310, the AGC trigger control 20 evaluates the data packets received by the processor 22 and determines a carrier of the data packets, based on carrier indication data within the data packets and identifies a nominal volume level of the carrier in the carrier indication table 18. At operation 315, the AGC trigger control 20 transmits a trigger control signal which is received by processor 22. At operation 320, the processor 22 determines whether the trigger control signal is an ON trigger control signal or an OFF trigger control signal. At operation 325, if the processor 22 determines that the trigger control signal is an OFF trigger control signal, the processor sends the data packets to the audio renderer 28 and plays corresponding audio via the speaker 30 at a volume level corresponding to a baseline volume level (e.g., 0.7) without adjusting (i.e., without increasing or decreasing) the volume level.

At operation 330, if the processor 22 determines that the trigger control signal is an ON trigger control signal (which has data indicating the nominal value of the carrier and data indicative of an instruction notifying the processor 22 that a determination should be made as to whether the volume level associated with the data packets should be adjusted (i.e., increased or decreased based on reduction and gain factors)), the processor 22 sends frames to a buffer 34 of the packet analyzer 24 and sends a control signal to the packet analyzer 24 to monitor the frames for a predetermined amount of time (e.g., 60 ms) and calculate a multiple frame average (e.g., three frame average). At operation 335, based on the value of the multiple frame average, score or categorize the multiple frames averaged as conforming to a high intensity, moderate intensity or a low intensity. (See discussion of operation 340 below) At operation 345, if the packet analyzer 24 scores the frames as high intensity or low intensity, the packet analyzer 24 sends a gain score signal to the gain control module 26. The gain score signal includes data associated with a predetermined value (e.g., 30%) by which to increase (i.e., a gain factor) a volume level corresponding to data packets of the frames when the frames are scored or categorized as low intensity. On the other hand, the gain score signal sent to the gain control module 26 by the packet analyzer 24 includes data associated with a predetermined value (e.g., 30) by which to decrease (i.e., a reduction factor) a volume level corresponding to data packets of the frames when the frames are scored or categorized as high intensity.

At operation 350, the packet analyzer 24 removes one of the frames (e.g., the oldest received frame) from the buffer 34 and sends this frame to the sound adjusting device 32 of the gain control module 26 which examines a gain score signal, having data indicative of the predetermined value, (e.g., 30%) and instructs the sound adjusting device 32 to adjust (i.e., increase (when the frames are scored or categorized as low intensity) or decrease (when the frames are scored or categorized as high intensity)) a volume level at the speaker 30 corresponding to the speech and/or audio data in the data packets of the frame based on the predetermined value (e.g., 30%). At operation 355, the sound adjusting device 32 sends the speaker 30 speech data having a volume level that is increased or decreased by an amount equal to the predetermined value (e.g., 30%) and plays the corresponding speech and/or audio data.

At operation 340, if the packet analyzer 24 scores the frames as moderate intensity based on the value of the mul-tiple frame average being within a predetermined range of the baseline volume level, the packet analyzer 24 removes one of the frames (e.g., the oldest received frame) stored in buffer 34 and sends the frames to speaker 30 which converts the signals in the data packets of the frame into sound and plays the corresponding speech data and/or audio data at a volume level corresponding to the baseline volume level (e.g., 0.7).

It is understood that the operations described for the illustrated methods of FIGS. 3A & 3B may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive manner.

That which is claimed:

1. A method comprising:
identifying, by a computer device, a first nominal volume level and a second nominal volume level associated with, respectively, a first carrier and a second carrier;
receiving, by the computer device, first data,
the first data being generated by the first carrier;
receiving, by the computer device, second data,
the second data being generated by the second carrier;
generating, by the computer device, one or more trigger control signals based on the first carrier and the second carrier associated, respectively, with the first data and the second data,
generating the one or more trigger control signals including:
comparing the first nominal volume level to a range of volume levels,
comparing the second nominal volume level to the range of volume levels,
determining, based on comparing the first nominal volume level to the range of volume levels, that the first nominal volume level is within the range of volume levels,
determining, based on comparing the second nominal volume level to the range of volume levels, that the second nominal volume level is outside the range of volume levels, and
generating the one or more trigger control signals based on the first nominal volume level being within the range of volume levels and the second nominal volume level being outside the range of volume levels;
determining, by the computer device and based on the one or more trigger control signals, not to evaluate a first volume level corresponding to the first data and to evaluate a second volume level corresponding to the second data; and
evaluating, by the computer device and based on determining to evaluate the second volume level, the second volume level corresponding to the second data,
evaluating the second volume level including:
arranging the second data into one or more frames, calculating a representative volume level associated with the one or more frames, categorizing the one or more frames based on the representative volume level, and determining whether to adjust the second volume level corresponding to the second data based on categorizing the one or more frames.

2. The method of claim 1, further comprising:

modifying the second volume level based on determining to adjust the second volume level corresponding to the second data; and generating audible sound associated with the second data based on modifying the second volume level.

3. The method of claim 1, further comprising:

automatically adjusting, based on determining to adjust the second volume level, the second volume level associated with the second data based on categorizing the one or more frames.

4. The method of claim 1, where categorizing the one or more frames includes associating the one or more frames with an intensity level, of a plurality of intensity levels, and where the plurality of intensity levels comprise at least two of:
a high intensity,
a low intensity, or
a moderate intensity.

5. The method of claim 1, further comprising:

identifying, based on determining to adjust the second volume level corresponding to the second data, a value by which to adjust the second volume level corresponding to the second data.

6. The method of claim 5, where categorizing the one or more frames includes associating the one or more frames with an intensity level, of a plurality of intensity levels, and where identifying the value, by which to adjust the second volume level corresponding to the second data, includes:
identifying the value based on the intensity level.

7. The method of claim 5, where identifying the value, by which to adjust the second volume level corresponding to the second data, includes:

identifying the value based on a comparison of the representative volume level to a particular volume level.

8. The method of claim 1, where identifying the first nominal volume level and the second nominal volume level includes:

identifying the first nominal volume level and the second nominal volume level prior to receiving the first data and the second data.

9. The method of claim 1, where the representative volume level is further based on the first volume level corresponding to the first data.

10. An apparatus comprising:

a processing element to:
determine a first nominal volume level associated with a first carrier,
determine a second nominal volume level associated with a second carrier that is different from the first carrier,
receive first data, the first data being generated by the first carrier,
receive second data, the second data being generated by the second carrier,
generate one or more trigger control signals based on the first carrier and the second carrier associated, respectively, with the first data and the second data,
the processing element, when generating the one or more trigger control signals, being further to:
determine that the first nominal volume level is within a range of volume levels and that the second nominal volume level is outside the range of volume levels, and
generate the one or more trigger control signals based on the first nominal volume level being within the range of volume levels and the second nominal volume level being outside the range of volume levels,
determine, based on the one or more trigger control signals, not to evaluate a first volume level corresponding to the first data and to evaluate a second volume level corresponding to the second data, and
evaluate the second volume level, corresponding to the second data, based on determining to evaluate the second volume level,
the processing element, when evaluating the second volume level corresponding to the second data, being further to:
arrange the second data into one or more frames,
calculate a representative volume level associated with the one or more frames,
categorize the one or more frames based on the representative volume level, and
determine whether to adjust the second volume level corresponding to the second data based on categorizing the one or more frames.

11. The apparatus of claim 10, where the processing element determines to adjust the second volume level corresponding to the second data, and where the processing element is further to:
generate first audible sound, associated with the first data, based on the first volume level,
adjust the second volume level, and
generate second audible sound, associated with the second data, based on the adjusted second volume level.

12. The apparatus of claim 10, where the processing element determines to adjust the second volume level corresponding to the second data, and where the processing element is further to:
automatically adjust the second volume level corresponding to the second data based on categorizing the one or more frames a data.

13. The apparatus of claim 10, where the processing element, when categorizing the one or more frames, is further to:

associate the one or more frames with an intensity level, of a plurality of intensity levels, and where the plurality of intensity levels comprise at least two of:
a high intensity category,
a low intensity category, or
a moderate intensity category.

14. The apparatus of claim 10, where the processing element is further to:

determine, based on determining to adjust the second volume level corresponding to the second data, a value by which to adjust the second volume level corresponding to the second data.

15. The apparatus of claim 14, where the processing element, when categorizing the one or more frames, is further to:

associate the one or more frames with an intensity level, of a plurality of intensity levels, and where the processing element, when determining the value, is further to:
determine the value, by which to adjust the second volume level corresponding to the second data, based on the intensity level.

16. The apparatus of claim 14, where the processing element, when determining the value by which to adjust the second volume level corresponding to the second data, is further to:
  determine the value based on a comparison of the representative volume level to a particular volume level.

17. The apparatus of claim 10, where the processing element, when calculating the representative volume level, is further to:
  determine the representative volume level further based on the first volume level corresponding to the first data.

18. A system comprising:
  a computing device to:
    receive, from a gateway device, information associated with first data from a first carrier, of a plurality of carriers, and second data from a second carrier, of the plurality of carriers,
    identify the first carrier and the second carrier associated, respectively, with the first data and the second data,
    generate one or more trigger control signals based on identifying the first carrier and the second carrier,
      the computing device, when generating the one or more trigger control signals, being further to:
        store a plurality of nominal volume levels associated with, respectively, the plurality of carriers,
        match the first carrier to a first nominal volume level, of the plurality of nominal volume levels,
        match the second carrier to a second nominal volume level, of the plurality of nominal volume levels,
        compare each of the first nominal volume level and the second nominal volume level to a range of volume levels, and
        generate the one or more trigger control signals based on comparing each of the first nominal volume level and the second nominal volume level to a range of volume levels, and
    determine, based on the one or more trigger control signals, to not evaluate a first volume level corresponding to the first data and to evaluate a second volume level corresponding to the second data.

19. The system of claim 18, where the computing device is further to:
  evaluate the second volume level corresponding to the second data,
  where the computing device, when evaluating the second volume level corresponding to the second data, is further to:
    arrange the second data into one or more frames,
    calculate a representative volume level associated with the one or more frames,
    categorize the one or more frames according to one or more intensity levels based on the representative volume level, and
    determine whether to adjust the second volume level corresponding to the second data based on categorizing the one or more frames.

20. The system of claim 19, where the representative volume level is further based on the first volume level.

21. The system of claim 18, where the computing device is further to:
  adjust the second volume level based on evaluating the second volume level,
  generate first audible sound associated with the first data at the first volume level, and
  generate second audible sound associated with the second data at the adjusted second volume level.

22. A non-transitory storage device to store instructions, the instructions comprising:
  one or more instructions that, when executed by a processor, cause the processor to receive first data and second data generated, respectively, by a first carrier and a second carrier;
  one or more instructions that, when executed by the processor, cause the processor to generate one or more trigger control signals based on the first carrier and the second carrier,
    the one or more instructions to generate the one or more trigger control signals including:
      one or more instructions to identify a first nominal volume level and a second nominal volume level associated with, respectively, the first carrier and the second carrier,
      one or more instructions to compare each of the first nominal volume level and second nominal volume level to a particular volume level, and
      one or more instructions to generate the one or more trigger control signals based on comparing each of the first nominal volume level and the second nominal volume level to the particular volume level; and
  one or more instructions that, when executed by the processor, cause the processor to determine, based on the one or more trigger control signals, not to evaluate a first volume level corresponding to the first data and to evaluate a second volume level corresponding to the second data.

23. The non-transitory storage device of claim 22, where the instructions further comprise:
  one or more instructions to evaluate the second volume level corresponding to the second data,
    the one or more instructions to evaluate the second volume level including:
      one or more instructions to arrange the second data into one or more frames,
      one or more instructions to calculate a representative volume level associated with the one or more frames, and
      one or more instructions to determine whether to adjust the second volume level corresponding to the second data based on the representative volume level.

24. The non-transitory storage device of claim 23, where the representative volume level is further based on the first volume level.

25. The non-transitory storage device of claim 23, where the instructions further comprise:
  one or more instructions to determine, based on determining to adjust the second volume level, a value by which to adjust the second volume level corresponding to the second data, based on at least one of:
    a comparison of the representative volume level to a particular volume level, or
    categorizing the one or more frames.

26. The non-transitory storage device of claim 22, where the instructions further comprise:
  one or more instructions to adjust the second volume level based on evaluating the second volume level;
  one or more instructions to generate first audible sound associated with the first data at the first volume level; and
  one or more instructions to generate second audible sound associated with the second data at the adjusted second volume level.

* * * * *